United States Patent
Alexander, Jr. et al.

(10) Patent No.: US 6,907,466 B2
(45) Date of Patent: Jun. 14, 2005

(54) METHODS AND SYSTEMS FOR EFFICIENTLY DELIVERING DATA TO A PLURALITY OF DESTINATIONS IN A COMPUTER NETWORK

(75) Inventors: Cedell A. Alexander, Jr., Durham, NC (US); Hood L. Richardson, Jr., Chapel Hill, NC (US); Edward J. Rovner, Chapel Hill, NC (US)

(73) Assignee: Extreme Networks, Inc., Santa Clara, CA (US)

( * ) Notice: Subject to any disclaimer, the term of this patent is extended or adjusted under 35 U.S.C. 154(b) by 769 days.

(21) Appl. No.: 10/008,513

(22) Filed: Nov. 8, 2001

(65) Prior Publication Data

US 2003/0088689 A1 May 8, 2003

(51) Int. Cl.[7] .................. G06F 15/177; H04L 12/28
(52) U.S. Cl. .................. 709/232; 709/236; 370/351; 370/235; 370/230
(58) Field of Search .................. 703/232, 236; 370/351, 235, 230

(56) References Cited

U.S. PATENT DOCUMENTS

| | | | | |
|---|---|---|---|---|
| 5,938,734 A | * | 8/1999 | Yao et al. | 709/232 |
| 6,084,859 A | * | 7/2000 | Ratcliff et al. | 370/252 |
| 6,122,670 A | | 9/2000 | Bennett et al. | |
| 6,205,525 B1 | * | 3/2001 | Korst | 711/154 |
| 6,343,313 B1 | * | 1/2002 | Salesky et al. | 709/204 |
| 6,345,302 B1 | | 2/2002 | Bennett et al. | |
| 6,741,575 B1 | * | 5/2004 | Zhang et al. | 370/329 |

OTHER PUBLICATIONS

Stevens, "TCP/IP Illustrated," vol. 1, p. 186, (1994).

* cited by examiner

Primary Examiner—Krisna Lim
(74) Attorney, Agent, or Firm—Jenkins, Wilson & Taylor, P.A.

(57) ABSTRACT

Methods and systems for efficiently delivering data to multiple destinations in a computer network are disclosed. Data to be delivered to multiple destinations is stored in memory. The stored data is divided into blocks. Checksums are pre-calculated for each block. Pre-calculated checksums are used to calculate the data checksums for data to be inserted in each packet to be delivered to data destinations.

25 Claims, 5 Drawing Sheets

METHODS AND SYSTEMS FOR EFFICIENTLY DELIVERING DATA TO A PLURALITY OF DESTINATIONS IN A COMPUTER NETWORK

TECHNICAL FIELD

The present invention relates to methods and systems for efficiently delivering data to a plurality of destinations in a computer network. More particularly, the present invention relates to methods and systems for efficiently computing checksums on data to be delivered to a plurality of destinations in a computer network.

BACKGROUND ART

In stream-oriented communications, such as streaming audio, video, and audio/video communications, it is often necessary to deliver the same data from one source to many different destinations. An example of such an application occurs when multiple students attempt to simultaneously connect to a server to view streaming video of a previously recorded lecture. Additional applications in which the same streaming source data may be delivered to multiple destinations include providing streaming audio, such as music, to multiple destinations or streaming video, such as news clips, to multiple destinations. In these scenarios, or any other scenario in which the same data is delivered to multiple clients, it is desirable that the destination computers be able to detect errors in received data so that the destinations can request retransmission of erroneous data.

One conventional method for detecting errors in received data packets is a checksum. A checksum is a calculated value used to test for the presence of errors in data when data is transmitted over a network or written to a memory device. Checksums are typically calculated by sequentially combining data bits using arithmetic and logic operations. In order to verify data in a communications scenario, a sender calculates a checksum for data to be transmitted and transmits the data and the checksum to a receiver. The receiver receives the data, computes a checksum for the received data, and compares the calculated checksum to the received checksum to detect the presence of errors in the data. If the calculated checksum does not match the received checksum, then the receiver determines that errors are present in the data and may take appropriate action, such as requesting retransmission of the data.

In streaming data applications, checksums are conventionally calculated for each block of data sent to each device, such as a computer. For example, in client-server streaming media applications, client computers may receive stream data from a server using the transmission control protocol (TCP) or user datagram protocol (UDP). Each TCP segment or UDP datagram includes a 16-bit integer checksum used to verify the integrity of the data in the TCP segment or UDP datagram, as well as the TCP or UDP header. To compute the checksum, the TCP or UDP software on the server computes the one's complement sum of each 16-bit block in the TCP or UDP header, the pseudo-header, and the data. The result is a 16-bit one's complement checksum that covers the TCP or UDP header, the data, and the pseudo-header, which includes data from the IP header. This calculation is repeated for each TCP segment or UDP datagram transmitted to each client. Because TCP segments and UDP datagrams may carry thousands of bytes of data, checksum computations may consume a significant percentage of available processor cycles of a streaming media sender.

In streaming media applications where the number of destinations receiving the same data is high, it is desirable to reduce the processing load on the sender for each recipient. Calculating a checksum each time that a TCP segment or UDP datagram is to be sent to each destination unnecessarily consumes a large amount of processing resources at the sending entity. As a result, the number of destinations capable of being served by each sending entity is reduced. The amount of hardware required to serve multiple streaming data destinations is increased. Accordingly, there exists a need for methods and systems for efficiently delivering streaming data to a plurality of recipients that reduce processing load per recipient at the sender.

DISCLOSURE OF THE INVENTION

According to one aspect, the present invention includes methods and systems for efficiently delivering streaming data to a plurality of destinations. The terms "stream data," "stream of data," and "streaming data" are used interchangeably herein and are intended to refer to data that is intended to be played or delivered to the end user in a continuous manner or stream. One method according to the invention includes storing a stream of data to be delivered to a plurality of destinations. The stored data may be audio data, video data, or audio and video data. The stream of data is divided into blocks of a predetermined size. Next, a checksum is pre-calculated for each of the blocks. Portions of the stream data to be sent to each of a plurality of destinations are identified. A checksum is calculated for the portion of the stream to be delivered to each destination. The checksum is calculated using the pre-calculated checksums for the blocks of the stream to be included in each portion. By pre-calculating checksums for blocks of data to be sent to a plurality of destinations and using the pre-calculated checksums to compute checksums to be inserted in the portion of data to be delivered to each destination, the present invention reduces the time and processing required to service each streaming data destination. As a result, more destinations can be served with the same processing power.

In one exemplary implementation, the pre-calculated checksum for each block of the stream data comprises a running checksum. By "running checksum," it is meant that the checksum for block n of the stream data includes the checksums for all blocks from the beginning of the stream data up to and including block n of the stream data. When the sender identifiers a portion of the stream data to be sent to a specific destination, the checksum for the outgoing packet can be calculated by computing the difference between the checksums of the first and last blocks in the packet. Computing a differential checksum based on pre-calculated running checksums for each block greatly reduces the sender's processing load for each client.

In another exemplary implementation, the pre-calculated checksum for each block of the stream data is calculated based only on the bits in each block. When the checksum is calculated for an outgoing packet, the sender adds the pre-calculated checksums for each block to be included in the outgoing packet. Adding pre-calculated checksums for blocks of data to be placed in an outgoing packet reduces the processing load on the sender over conventional implementations in which checksums are calculated "from scratch" for every portion of data to be sent to every client.

Accordingly, it is an object of the invention to provide methods and systems for delivering data to a plurality of recipients that reduce the processing load per recipient on the sender.

It is another object of the invention to provide methods and systems for reducing processing requirements and time for calculating per-packet checksums.

Some of the objects of the invention having been stated hereinabove, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
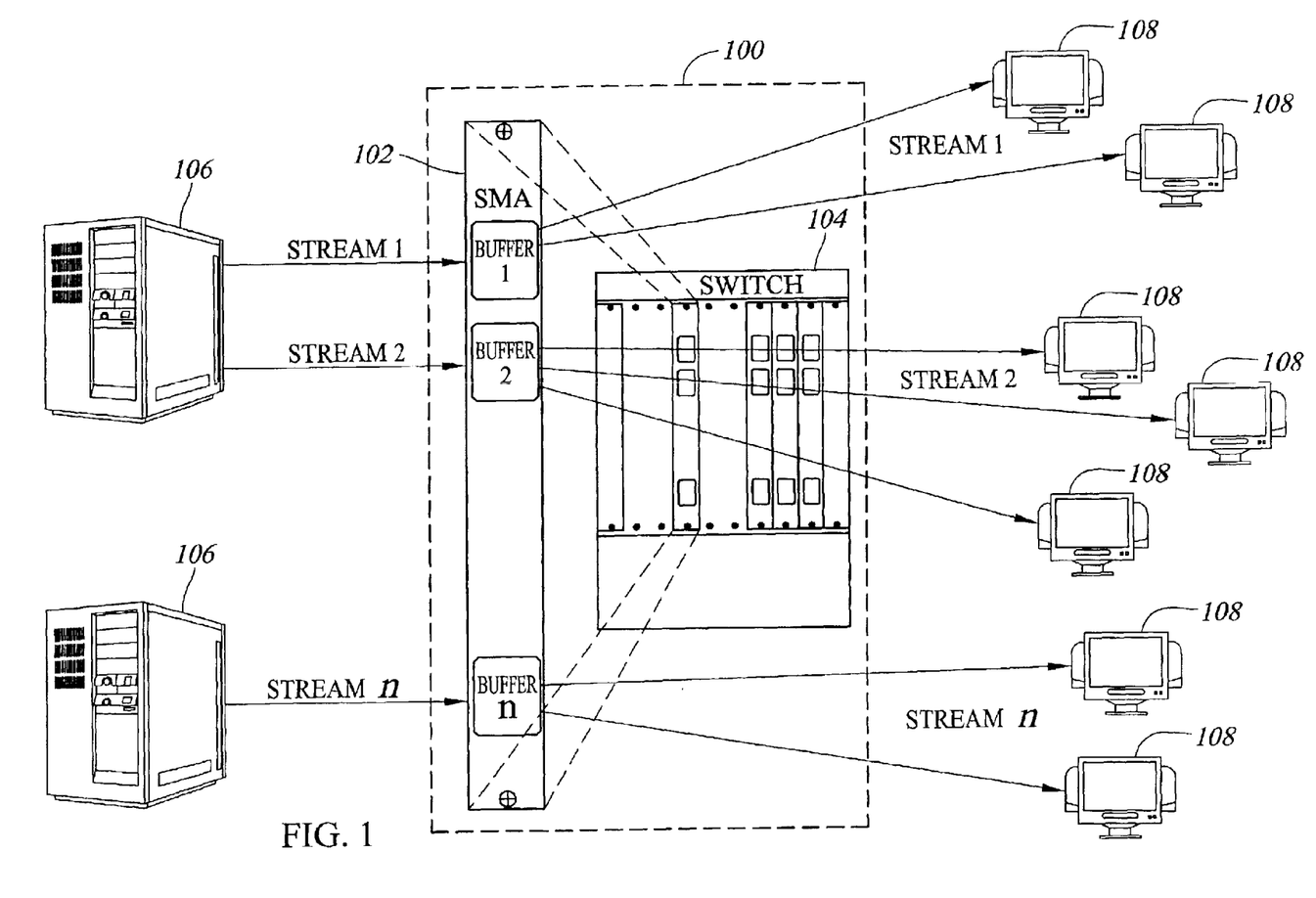
FIG. 1 is a block diagram a system for delivering streaming data to a plurality of recipients according to an embodiment of the present invention.

FIG. 1 illustrates a system 100 for delivering streaming data to a plurality of recipients according to an embodiment of the present invention. In FIG. 1, system 100 includes a streaming media accelerator 102 and a switch 104. Streaming media accelerator 102 buffers streaming data received from streaming media sources 106 and forwards the streaming data to streaming media destinations 108.

In the illustrated example, streaming media accelerator is implemented as a component or module of switch 104. For example, switch 104 may be a chassis-type switch in which multiple modules, each comprising a printed circuit board, connected via a high-speed backplane. Switch 104 may include a switch fabric that receives incoming packets and forwards the packets to the appropriate processing module and directs outgoing packets to the appropriate output interface. One example of a switch suitable for use with embodiments of the present invention is the Black Diamond™ Gigabit Ethernet Chassis available from Extreme Networks, Inc., of Santa Clara, Calif.

The present invention is not limited to using the Black Diamond™ Gigabit Ethernet Chassis or to a streaming media accelerator module implemented as a component of such a switch. For example, in an alternate embodiment, streaming media accelerator 102 may be located in a streaming media source, such as a streaming media server, to send the media stream directly to one or more clients. However, locating streaming media accelerator 102 in a switch 104 that receives streams from multiple sources and fans the streams out to multiple destinations is preferred to reduce the number of streaming media sources.

In the illustrated example, streaming media accelerator 102 buffers n streams of data received from streaming data sources 106 and sends each stream to multiple destinations 108. The streams may be simultaneously sent to each destination or sent at different times. The checksum computation methods described herein allow efficient replication of data to multiple destinations, even when the destinations receive data streams at different times.

Figure 2:
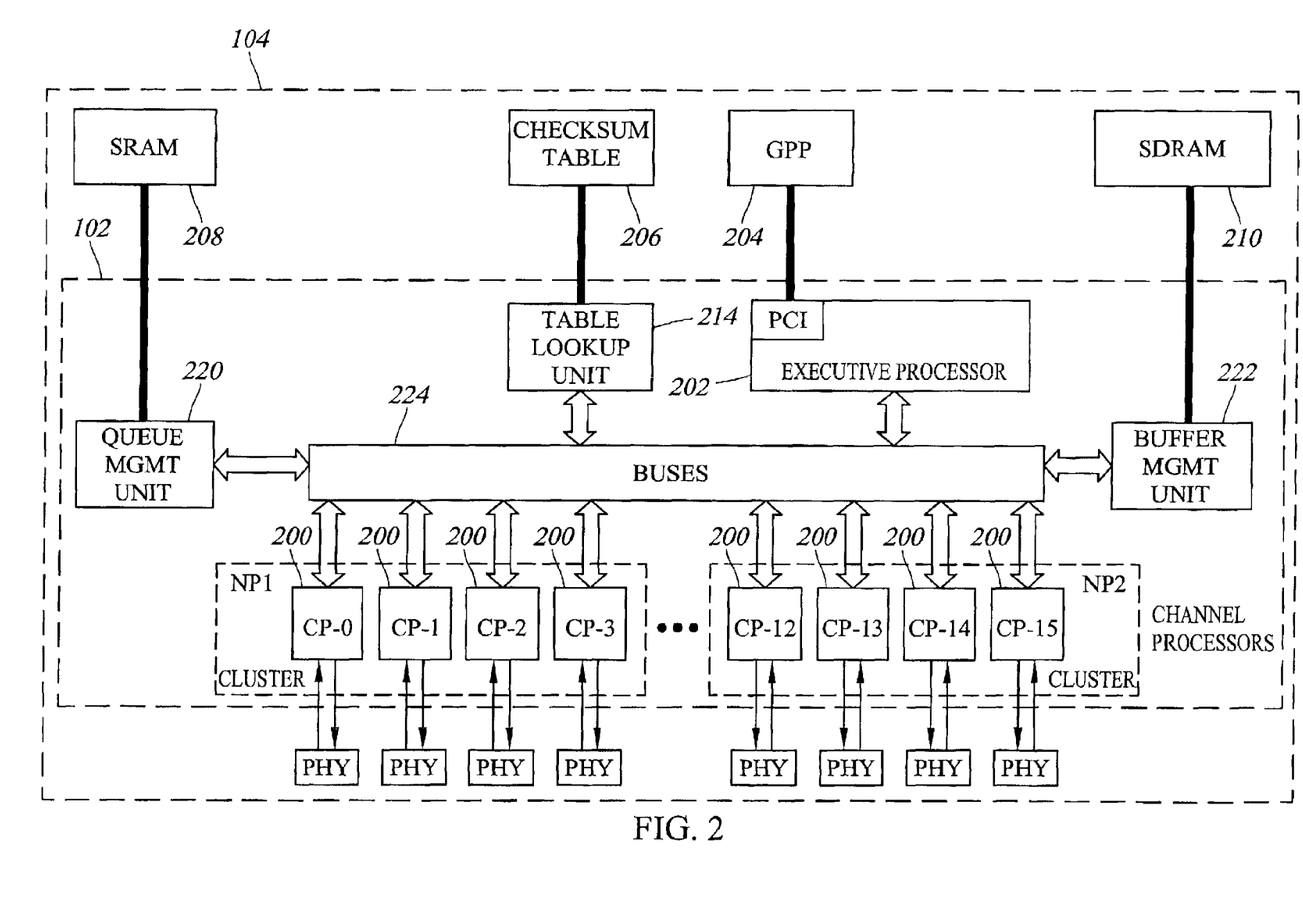
FIG. 2 is a block diagram of a streaming media accelerator according to an embodiment of the present invention.

FIG. 2 is a block diagram illustrating an exemplary architecture for streaming media accelerator 102 and components of switch 104 that communicate with streaming media accelerator 102 according to an embodiment of the present invention. In the illustrated example, streaming media accelerator 102 includes a plurality of channel processors 200 that communicate with stream data destinations 108 over a high-speed backplane, such as a gigabit Ethernet back plane or an OC-n backplane. Exemplary channel processors suitable for use with embodiments of the present invention include the C-PORT C5 channel processors available from Motorola.

An executive processor 202 and a general-purpose processor 204 parse requests received from multimedia destinations 108 to identify the stream of data to be sent to each destination 108. An exemplary commercially available processor suitable for use as general-purpose processor 204 is the Power PC MPC 750 available from Motorola.

According to an important aspect of the invention, general-purpose processor 204 pre-calculates checksums for blocks of data received from streaming media sources 106. Exemplary methods for pre-calculating the checksum will be described in more detail below.

Switch 104 also includes memory devices 206, 208, and 210 for buffering and storing data. In particular, memory device 206 may be used to store a table of pre-calculated checksums generated by GPP 204. These pre-calculated checksums may be used by channel processors 200 to compute checksums to be included in outbound data packets. A table lookup unit 214 performs lookups in the pre-calculated checksum table. Exemplary data that may be stored in the pre-calculated checksum table will be discussed in more detail below. Memory device 208 is used for exchanging messages between processors. Memory 210 is used to buffer incoming and outgoing data.

Streaming media accelerator 102 may also include a queue management unit 220, a buffer management unit 222, and communications buses 224. Queue management unit 220 enqueues and dequeues data in memory device 208 to be processed by channel processors 200 and executive processor 202. Buffer management unit 222 controls the buffering of stream data in memory device 210. Buses 224 provide communications between processors and management units within streaming media accelerator 102.

Figure 3:
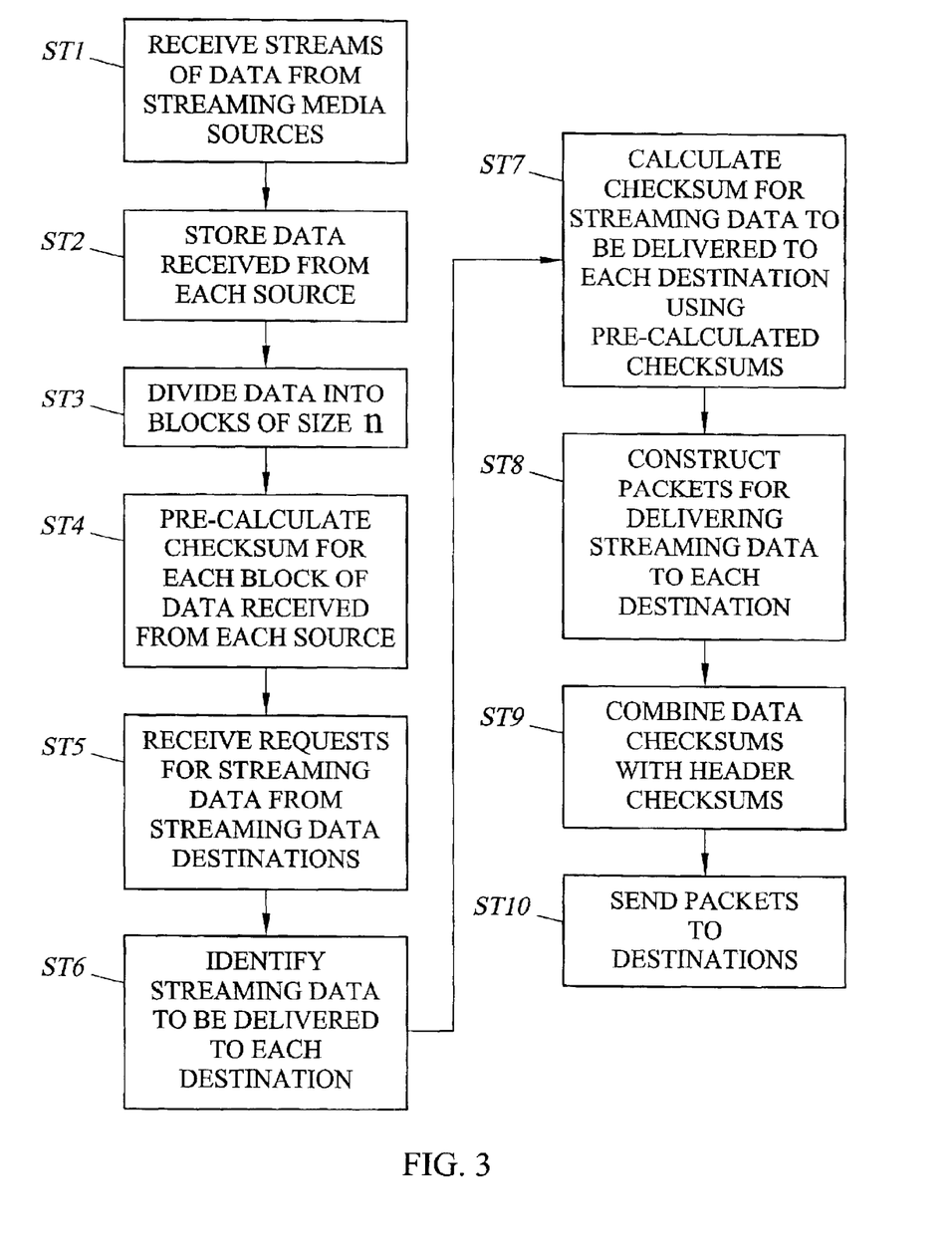
FIG. 3 is a flow chart illustrating exemplary steps for computing a checksum for an outgoing streaming media data packet according to an embodiment of the present invention.

FIG. 3 is a flow chart illustrating exemplary steps performed by streaming media accelerator 102 in efficiently calculating checksums and delivering streaming data to streaming media destinations 108 according to an embodiment of the present invention. Referring to FIG. 3, in step ST1, streaming media accelerator 102 receives streams of data from streaming media sources 106. The data may be any data to be delivered or played continuously to or by multiple destinations. Examples of such data include audio data, video data, or audio and video data. The data may be received using a connection-oriented protocol, such as TCP, or a connectionless protocol, such as UDP. In step ST2, streaming media accelerator 102 stores stream data received from each source. Referring back to FIG. 2, the stream data may be stored in memory device 210. The amount of data for each stream buffered by streaming media accelerator 102 may be negotiated in advance with each streaming media source to be of sufficient size for delivering a continuous stream of data to the destinations.

According to an important aspect of the invention, in steps ST3 and ST4, streaming media accelerator 102 divides the data received from each source 106 into blocks and pre-calculates the checksum for each block. By "pre-calculating," it is meant that the checksum for a block of stream data received from streaming media sources is calculated in advance of the calculation of the checksums inserted in the headers of outbound data packets to be delivered to destinations 108. As will be described in more detail below, these pre-calculated checksums will be used to calculate the checksums that are inserted in outbound packet headers. Because streams may be transmitted multiple times, calculating the checksums in advance greatly reduces the processing load on switch 104. Two efficient methods for pre-calculating the checksums for each block of data will be described in detail below.

In step ST5, streaming media accelerator 102 receives requests for streaming data from streaming data destinations 108. The requests may be sent in TCP segments or UDP datagrams. In addition, each request may include application layer information that identifies the stream of data requested by each destination. In step ST6, streaming media accelerator identifies the streaming data to be delivered to each destination. This step may be performed using application-layer identification data provided by streaming media destinations 108.

In step ST7, streaming media accelerator 102 calculates checksums for streaming data to be delivered to each destination using the pre-calculated checksums computed in step ST4. In one embodiment, the pre-calculated checksums for each block of data are running checksums. The data checksum for each outbound data portion may be calculated by subtracting the running checksum for the first block of data to be included in an outbound data packet from the running checksum for the last block of data to be included in an outbound data packet. Performing such a differential checksum calculation greatly reduces the processing load on channel processors 200. In an alternate embodiment, the pre-calculated checksums for each block of data may be calculated based only on the data in each block. Channel processors 200 may then calculate the data checksum for each outgoing packet by summing the checksums for each block.

Although in the example described above, checksum pre-calculation is performed by the executive processor and data packet checksums are calculated by channel processors, the present invention is not limited to such an embodiment. For example, a single processor may perform both checksum pre-calculation and packet checksum calculation. Either method is intended to be within the scope of the invention.

In step ST8, streaming media accelerator 102 constructs packets for delivering streaming data to each destination. If the underlying transport layer protocol is TCP, then the packets may be TCP segments. If the underlying transfer protocol is UDP, then the outgoing packets may be UDP datagrams. In step ST9, streaming media accelerator 102 combines the data checksums with the header checksums. Combining the checksums may be accomplished simply by adding the data checksums to the header checksums. In step ST10, streaming media accelerator sends the data packets to their intended destinations. Because checksums are pre-calculated and re-used to calculate checksums for outgoing data packets, the processing load on the streaming media sender is reduced over conventional applications.

Figure 4:
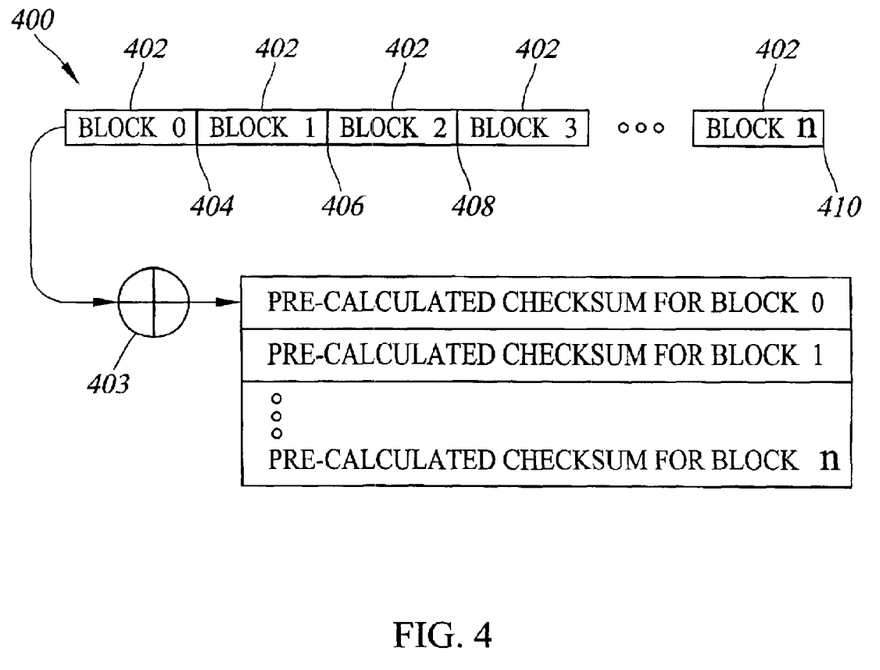
FIG. 4 is a block diagram illustrating exemplary checksum pre-calculation for a block of streaming data according to an embodiment of the present invention.

FIG. 4 is a block diagram illustrating an exemplary method and systems for pre-calculating checksums according to an embodiment of the present invention. In FIG. 4, block 400 represents a stream of data received from a multimedia source. The data is divided into blocks 402 of a predetermined size. For example, blocks 402 may each be 128 bytes in size. Blocks 402 may be further subdivided into smaller blocks for checksum calculations. For example, since the checksum field in both the TCP and UDP headers is 16 bits, blocks 402 may each be subdivided into 16-bit units. Once blocks 402 have been subdivided into 16-bit units, a checksum is computed by adding the 16-bit units in each block, for example, using one's complement addition. Accordingly, the present invention may include a checksum pre-calculator 403 for pre-calculating checksums. Checksum pre-calculator 403 may be implemented in software executing on one or more of the processors resident on streaming media accelerator 102.

As stated above, one method for pre-computing the checksum in each block, which decreases the time required to compute the checksum for each stream, is computing running checksums. The running checksum for a given block is the sum of the checksum for that block and the running checksum for the previous block. In the case where there are no previous blocks, for example, in FIG. 4, the running checksum for point 404 in the data stream is calculated based on the bits in block 0 only. The checksum for point 406 in the data stream is the sum of the checksum for block 1 and the running checksum for block 0. Similarly, the checksum stored for point 408 in the data stream is the sum of the checksum for block 2 and the running checksum for block 1. The checksum stored for point 410 at the end of block n in the data stream is then the sum of the checksum for block n and the running checksum for block n−1.

Figure 5:
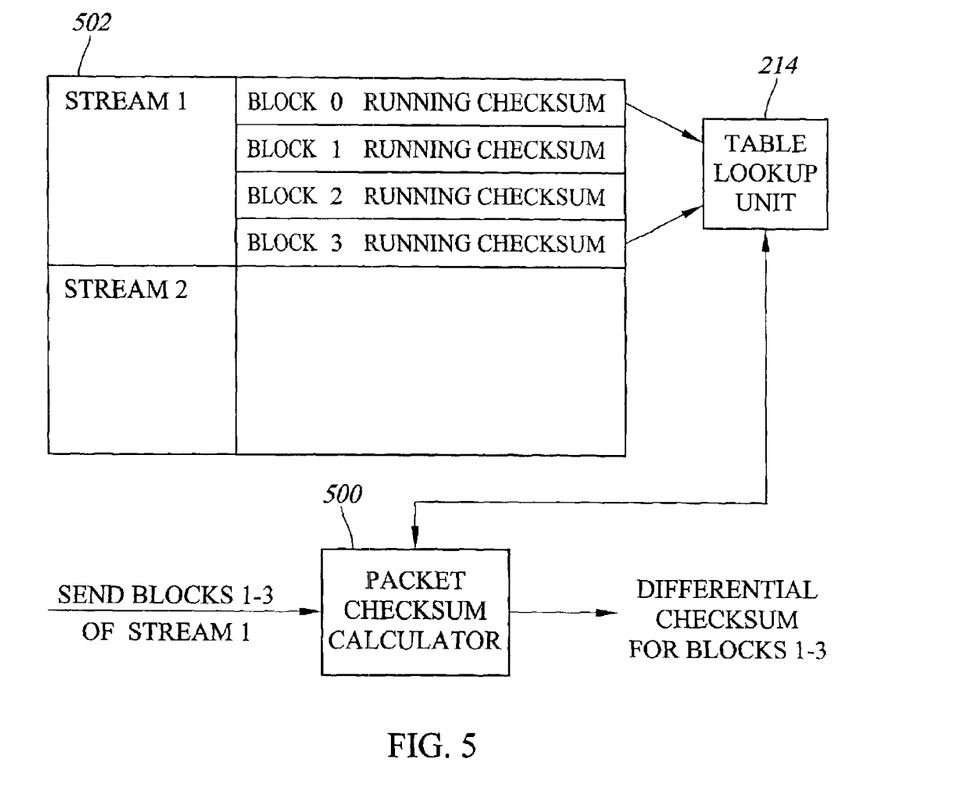
FIG. 5 is a block diagram illustrating per-packet checksum calculation using stored pre-calculated running checksum values according to an embodiment of the present invention.

As the running checksum values are calculated, they are preferably stored in memory for use in calculating the checksums to be included in outbound data packets. As stated above, in streaming media accelerator 102, the checksums for each stream may be stored in memory device 206 accessible by a table lookup unit 214. FIG. 5 is a block diagram illustrating in further detail the calculation of a data checksum performed based on running checksums according to an embodiment of the invention. In FIG. 5, a packet checksum calculator 500, which may be implemented in software executing on channel processors 200 illustrated in FIG. 2 or any other suitable processor, receives instructions to send data blocks 1 through 3 of stream 1. Packet checksum calculator 500 informs table lookup unit 214 that the running checksums for blocks 0 and 3 are required. Table lookup unit 214 performs a lookup in table 502 and extracts the running checksums for the ends of blocks 0 and 3 from the checksum data stored for stream 1. Table lookup unit 214 outputs this data to packet checksum calculator 500 Packet checksum calculator 500 computes the difference of the checksums stored for blocks 0 and 3 and outputs a differential checksum for blocks 1 through 3.

Computing a differential checksum may be accomplished using one's complement arithmetic by adding the checksum from block 3 to the complement of the checksum of block 0. For example, if the running checksum stored for block 3 is 1010101100110111 and the checksum stored for block 0 is 1110011110110110, the differential checksum may be calculated as follows:

Differential Checksum Calculation $$\begin{array}{r} 1010101100110111 \\ + \underline{0001100001001001} \\ 1100001110000000 \end{array} \quad (1)$$

In equation 1, the top addend is the running checksum for block 3. The bottom addend is the complement of the running checksum for block 0. The sum is the difference in the checksums between blocks 3 and 0. Thus, it is apparent from equation 1 above that a differential checksum calculation for a large number of data blocks involves simple one's complement addition of only two checksums, which greatly reduces the calculation over conventional calculation methods that compute checksums, 16 bits at a time, for each portion of data to be sent. As stated above, an alternate method for pre-calculating checksums is to calculate the checksums for each block and store the pre-calculated checksums for each block in memory. Referring back to FIG. 4, the checksum for each block 402 would simply be the one's complement sum of each 16-bit sub-block of each block. In order to calculate a checksum for an outgoing data packet using these pre-calculated checksums, packet checksum calculator 500 illustrated in FIG. 5 would simply sum the checksums for each block to be included in an outgoing data packet. For example, if it is desirable to send blocks 0 through 3 to a destination, the checksum for blocks 0 through 3 would be calculated by summing the pre-calculated stored checksum values for block 0, block 1, block 2, and block 3. This checksum calculation involves more computation when data is sent, compared to the first method above. However, because the pre-calculated checksum values are reused each time a data stream is requested by a destination, significant time and processing savings are achieved over conventional TCP and UDP checksum calculation routines.

In TCP, the size of a TCP segment to be sent to a given destination depends on several factors, including the maximum transfer unit of the network between streaming media accelerator 102 and the destination and the TCP receive buffer size at the destination. In the event that the data to be transmitted in an outbound packet does not equal an integer number of data blocks for which checksums were pre-calculated, the data may be truncated to an integer number of blocks and the remainder sent in a later packet. Alternatively, a checksum may be calculated for the outbound data packet using the pre-calculated checksums for the portion of the data packet that comprises an integer number of blocks. A checksum may then be calculated for the remainder of the data using conventional one's complement addition. The two checksums may then be added to each other. If the end of the data is reached, any remainder will have its checksum calculated conventionally.

Once the checksum for the data stream is calculated, the checksum is added to the appropriate header checksum. The TCP or UDP header checksum may also be pre-calculated for the fields in the header that remain fixed for a given media stream communication. For example, if a given multimedia destination establishes a TCP connection with streaming media accelerator 102, the checksum for header fields, such as the source and destination IP address and the source and destination TCP ports will be fixed for the life of the connection. The checksum for these fields may be pre-calculated and stored. The checksum for the variable header fields, such as window size, sequence number, and acknowledgement number, may be calculated for each packet and added to the pre-calculated checksum to be included in the header field of each packet. The pre-calculating of checksums for fixed header fields further decreases the amount of processing per packet to be performed in sending streaming data to a destination.

Thus, the present invention includes methods and systems for efficiently delivering multimedia data to a plurality of destinations. Checksums are pre-calculated and stored for streams of data to be delivered to each destination. The pre-calculated checksums are used to calculate data checksums to be included in outbound packets. The pre-calculated checksums may be running checksums or simply checksums of each block of the stored data. Checksums for fixed header fields may also be calculated in advance. Because checksums are pre-calculated, the amount of duplicate processing in delivering stream-oriented data to a plurality of destinations is reduced.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for efficiently delivering data to a plurality of destinations, the method comprising:
    (a) storing data to be delivered to a plurality of destinations;
    (b) dividing the data into blocks of a predetermined size;
    (c) pre-calculating a checksum for each of the blocks;
    (d) identifying portions of the data to be sent to the destinations; and
    (e) calculating a checksum for the portion of the data to be delivered to each destination using the pre-calculated checksums for the blocks of the data included in each portion.

2. The method of claim 1 wherein storing data to be delivered to a plurality of destinations includes storing a stream of audio data to be delivered to a plurality of destinations.

3. The method of claim 1 wherein storing data to be delivered to a plurality of destinations includes storing a stream of video data to be delivered to a plurality of destinations.

4. The method of claim 1 wherein storing data to be delivered to a plurality of destinations includes storing a stream of audio and video data to be delivered to a plurality of destinations.

5. The method of claim 1 wherein pre-calculating a checksum includes calculating a running checksum for each block, the running checksum for the $n^{th}$ block comprising the sum of the checksum of the $n^{th}$ block and the running checksum for the $(n-1)^{th}$ block, n being an integer, and wherein calculating a checksum for the portion of the data to be delivered to each destination includes computing a difference checksum based on the running checksums for the first and last blocks of data included in the portion of data to be delivered to each destination.

6. The method of claim 1 wherein pre-calculating a checksum includes calculating a checksum based only on the data in each block and wherein calculating a checksum for the portion of data to be delivered to each destination comprises summing the pre-calculated checksums of each block in each portion of data to be delivered to each destination.

7. The method of claim 1 comprising combining the checksum for the portion of the data to be delivered to each destination with a packet header checksum used to deliver the data to each destination.

8. The method of claim 7 comprising forwarding the packets to each of the destinations.

9. The method of claim 8 wherein forwarding the packets to each of the destinations includes forwarding UDP datagrams to each of the destinations.

10. The method of claim 8 wherein forwarding the packets to each of the destinations includes forwarding TCP segments to each of the destinations.

11. A streaming media accelerator comprising:
(a) a checksum pre-calculator for dividing data into blocks of a pre-determined size and for pre-calculating a checksum for each of the blocks; and
(b) a packet checksum calculator operatively associated with the checksum pre-calculator for computing checksums for outbound packets to be delivered to a plurality of destinations using the pre-calculated checksums.

12. The streaming media accelerator of claim 11 wherein the checksum pre-calculator is adapted to calculate a running checksum for the data, the running checksum for the $n^{th}$ block comprising a sum of the checksum of the $n^{th}$ block and the running checksum for the $(n-1)^{th}$ block, n being an integer.

13. The streaming media accelerator of claim 11 wherein the checksum pre-calculator is adapted to pre-calculate a checksum for each of the blocks of data and the packet checksum calculator is adapted to compute checksums for outbound packets by summing the checksums for each of the blocks of data.

14. The streaming media accelerator of claim 11 wherein the packet checksum calculator is adapted to pre-compute checksums for fixed header fields to be included in outbound packets.

15. The streaming media accelerator of claim 11 comprising a plurality of channel processors for receiving connection requests from the destinations and identify portions of the data to be sent to each of the destinations.

16. The streaming media accelerator of claim 15 wherein the packet checksum calculator is adapted to determine whether the portions of data to be sent to each of the destinations are an integer multiple of n blocks, n being an integer.

17. The streaming media accelerator of claim 16 wherein the packet checksum calculator is adapted to truncate data in each outbound packet to an integer multiple of n blocks.

18. The streaming media accelerator of claim 16 wherein the packet checksum calculator is adapted to compute a checksum for an outbound data packet using the portion of data to be included in the outbound data packet that is an integer multiple of n blocks and to calculate a remainder checksum for remaining data that is not an integer multiple of n blocks.

19. The streaming media accelerator of claim 11 comprising a plurality of buffers for storing a plurality of data streams, wherein the checksum pre-calculator is adapted to pre-calculate checksums for each of the blocks in each of the data streams.

20. The streaming media accelerator of claim 19 wherein the checksums for each block of data is associated in memory with the corresponding data.

21. A switch for delivering data received from a plurality of data servers to a plurality of data clients, the switch comprising: at least one streaming media accelerator for receiving data from the servers, pre-computing checksums for blocks of data received from each server, using the pre-computed checksums to calculate checksums for data packets to be sent to each client, and forwarding the data to each of the clients.

22. The switch of claim 21 wherein the streaming media accelerator is adapted to pre-calculate running checksums for blocks of data to be delivered to the clients and to use the running checksums to calculate the checksums for outgoing data packets.

23. The switch of claim 21 wherein the streaming media accelerator is adapted to calculate a one's complement checksum based only on the bits of each block of data and to sum the pre-calculated checksums in order to calculate the checksum for each outgoing data packet.

24. The switch of claim 21 comprising a chassis for holding a plurality of streaming media accelerators.

25. The switch of claim 24 wherein the chassis includes a high-speed backplane for connecting the plurality of streaming media accelerators.

* * * * *